(12) United States Patent
Hart et al.

(10) Patent No.: US 8,700,392 B1
(45) Date of Patent: Apr. 15, 2014

(54) SPEECH-INCLUSIVE DEVICE INTERFACES

(75) Inventors: Gregory M. Hart, Mercer Island, WA (US); Ian W. Freed, Seattle, WA (US); Gregg Elliott Zehr, Palo Alto, CA (US); Jeffrey P. Bezos, Greater Seattle Area, WA (US)

(73) Assignee: Amazon Technologies, Inc., Reno, NV (US)

( * ) Notice: Subject to any disclaimer, the term of this patent is extended or adjusted under 35 U.S.C. 154(b) by 410 days.

(21) Appl. No.: 12/879,981

(22) Filed: Sep. 10, 2010

(51) Int. Cl.
*G10L 15/00* (2006.01)

(52) U.S. Cl.
USPC .......................................... 704/231; 704/236

(58) Field of Classification Search
USPC ................................................ 704/231–257
See application file for complete search history.

(56) References Cited

U.S. PATENT DOCUMENTS

| | | | | |
|---|---|---|---|---|
| 4,866,778 A * | 9/1989 | Baker | ............................ | 704/254 |
| 5,621,858 A * | 4/1997 | Stork et al. | .................... | 704/232 |
| 5,632,002 A * | 5/1997 | Hashimoto et al. | ........... | 704/231 |
| 5,960,394 A * | 9/1999 | Gould et al. | ............... | 704/270.1 |
| 6,185,529 B1* | 2/2001 | Chen et al. | .................... | 704/251 |
| 6,594,629 B1* | 7/2003 | Basu et al. | .................... | 704/251 |
| 6,728,680 B1* | 4/2004 | Aaron et al. | ................. | 704/271 |
| 7,039,198 B2 | 5/2006 | Birchfield et al. | | |
| 7,082,393 B2* | 7/2006 | Lahr | ............................ | 704/233 |
| 7,587,053 B1 | 9/2009 | Pereira | | |
| 7,613,310 B2 | 11/2009 | Mao | | |
| 7,760,248 B2* | 7/2010 | Marks et al. | ................ | 348/231.4 |
| 7,761,302 B2* | 7/2010 | Woodcock et al. | ........... | 704/270 |
| 8,150,063 B2 | 4/2012 | Chen et al. | | |
| 8,296,151 B2* | 10/2012 | Klein et al. | .................... | 704/275 |
| 2002/0194005 A1* | 12/2002 | Lahr | ............................. | 704/271 |
| 2003/0083872 A1* | 5/2003 | Kikinis | ........................ | 704/243 |
| 2003/0171921 A1* | 9/2003 | Manabe et al. | ............... | 704/232 |
| 2004/0122666 A1* | 6/2004 | Ahlenius | ....................... | 704/231 |
| 2004/0205482 A1* | 10/2004 | Basu et al. | ................. | 715/500.1 |
| 2005/0064912 A1 | 3/2005 | Yang et al. | | |
| 2006/0143006 A1* | 6/2006 | Asano | ........................... | 704/238 |
| 2010/0179811 A1* | 7/2010 | Gupta et al. | .................. | 704/235 |
| 2010/0233996 A1 | 9/2010 | Herz et al. | | |
| 2010/0280983 A1* | 11/2010 | Cho et al. | ........................ | 706/46 |
| 2011/0164105 A1 | 7/2011 | Lee et al. | | |
| 2011/0184735 A1* | 7/2011 | Flaks et al. | .................... | 704/240 |
| 2011/0285807 A1* | 11/2011 | Feng | .......................... | 348/14.08 |

OTHER PUBLICATIONS

Van Veen, Barry D., et al., "Beamforming A Versatile Approach to Spatial Filtering," *IEEE ASSP Magazine*, Apr. 1988.

(Continued)

*Primary Examiner* — Douglas Godbold
(74) *Attorney, Agent, or Firm* — Novak Druce Connolly Bove + Quigg LLP

(57) ABSTRACT

A user can provide input to a computing device through various combinations of speech, movement, and/or gestures. A computing device can analyze captured audio data and analyze that data to determine any speech information in the audio data. The computing device can simultaneously capture image or video information which can be used to assist in analyzing the audio information. For example, image information is utilized by the device to determine when someone is speaking, and the movement of the person's lips can be analyzed to assist in determining the words that were spoken. Any gestures or other motions can assist in the determination as well. By combining various types of data to determine user input, the accuracy of a process such as speech recognition can be improved, and the need for lengthy application training processes can be avoided.

34 Claims, 12 Drawing Sheets

(56) References Cited

OTHER PUBLICATIONS

"Final Office Action dated Apr. 16, 2013", U.S. Appl. No. 12/902,986, Apr. 16, 2013, 31 pages.

"Non Final Office Action dated Dec. 26, 2012", U.S. Appl. No. 12/902,986, Dec. 26, 2012, 27 pages.

Valin, Jean-Marc et al., "Robust Sound Source Localization Using a Microphone Array on a Mobile Robot", Research Laboratory on Mobile Robotics and Intelligent Systems; Department of Electrical Engineering and Computer Engineering; Universite de Sherbrooke, Quebec, Canada, 9 pages.

* cited by examiner

| General interface | Web browser |
|---|---|
| Open | Search |
| Close | Close |
| Shut down | Shut down |
| Browser | Browser |
| Email | Options |
| Photos | Home page |
| Documents | New window |
| Video | Go back |
| Find | Refresh |
| My settings | Follow link |
| Options | Minimize window |
| ⋮ | ⋮ |

"Send to Sarah"

"Send to All"

"Send to Mark"

"Send to Any"

SPEECH-INCLUSIVE DEVICE INTERFACES

BACKGROUND

As the variety of available computing devices increases, and as the size of many of these devices decreases, people are increasingly utilizing portable devices such as cellular phones, personal digital assistants (PDAs) and other electronic devices to perform an ever-increasing variety of tasks. Accordingly, there comes a need to adapt the ways in which users interface with these computing devices to perform these tasks. For example, while typing on a keyboard is an easy and acceptable way for many users to input information for a desktop computer, trying to enter information on a keyboard of a portable phone can be difficult due to the small form factor of the device. Some devices allow for voice commands or voice input, but the accuracy of such input can vary based upon factors such as background noise, consistency in the user's voice and speech patterns and proximity of the user to the device. Further, many voice recognition applications require the user to undergo a lengthy training process, wherein the user must speak a long list of words in order to "train" the device to recognize the way in which the user pronounces certain alphanumeric characters and combinations of those characters.

BRIEF DESCRIPTION OF THE DRAWINGS

Various embodiments in accordance with the present disclosure will be described with reference to the drawings, in which.

DETAILED DESCRIPTION

Figure 1:
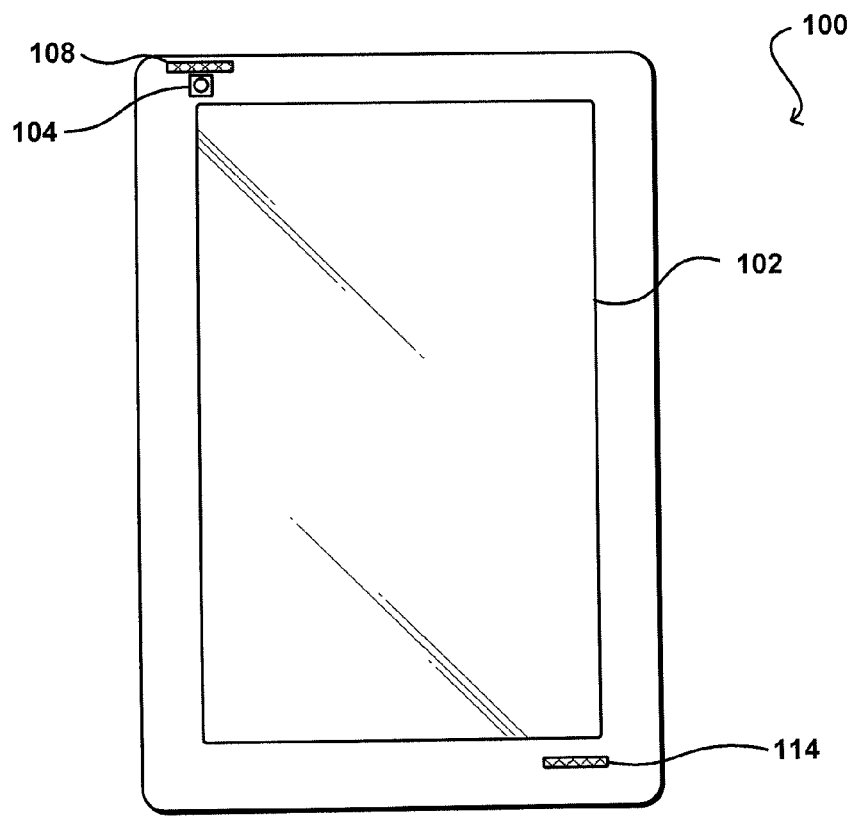
FIG. 1 illustrates an example of a computing device including elements operable to capture audio and video information that can be used in accordance with various embodiments.

Systems and methods in accordance with various embodiments of the present disclosure may overcome one or more of the aforementioned and other deficiencies experienced in conventional approaches to controlling or otherwise providing input to a system, device, interface or other such object or element in an electronic environment. Systems and methods in accordance with various embodiments identify user input through speech recognition, image analysis and combinations thereof. In some embodiments, a computing device includes at least one audio capture element for capturing audio data (e.g., recording speech) of a user and at least one image capture element for concurrently/simultaneously capturing image data (e.g., images or video) of the user. One or more speech recognition or analysis algorithms can analyze the captured audio data to detect a presence of speech information contained in the captured audio data (e.g., commands or input spoken by the user). One or more image analysis algorithms can analyze motion of the user, such as the movement of the user's mouth and/or lips (e.g., while the user is speaking). In response to detecting the presence of speech information and detecting user movement, one or more of the algorithms may attempt to identify at least one user input utilizing at least the combination of the speech information and the user movement for a defined period of time (e.g., for a time during which the speech information was detected). If a confidence level of the identified user input meets or exceeds a defined or selected confidence level, the identified user input is processed. In one example, one or more algorithms, utilizing detected speech information and mouth movement of a user, identifies that the user said "Browse." If the identification of the term "Browse" met or exceeded a confidence level, the device enables or activates a web browser. If, on the other hand, the device could not confidently identify the term "Browse" utilizing the combination of the speech information and the movement information, no command or user input would be processed by the device. Similarly, if the device identified the term "Browse" with the confidence level exceeding a defined threshold but could not match the identified term to an input term, no command or user input would be processed by the device. In either case, the device would continue to monitor for speech information and movement data.

In other embodiments, an algorithm might attempt to analyze the speech input first, as audio analysis can be significantly less resource intensive than analyzing continuous video or images. In such an embodiment, the algorithm might only analyze a portion of the video input when the speech recognition algorithm, by itself, cannot analyze one or more words within at least an allowable degree of certainty. For example, a user might speak a command to the device of "Open word processing." The device might be unable to determine, within an acceptable degree of certainty, whether the user said "Word" or "Weird." In such an instance, the device can analyze a portion of the captured video corresponding to the speech. In some embodiments, the video may be buffered for a minimum amount of time to enable such analysis. A person typically makes substantially different lip movements to form each word, making a relatively round shape to make the "o" in "Word" while stretching the lips to pronounce the "ei" in "Weird." By analyzing the shape and/or movement of the user's lips around the time the word was pronounced, based on the captured images or video, the device can increase the level of certainty that the user actually said "Word."

Further, because the user is interacting with an interface of a computing device, there is a limited number of words and phrases that typically will be spoken by the user as input. Thus, a "dictionary" or other grouping or collection of words that are likely to be spoken by the user for providing a command to the device can be selected, which can contain significantly fewer words than might otherwise be considered. In the prior example, the algorithm might not have even considered the word "Weird" because that word likely would not be provided as an interface command. Having to analyze and identify fewer words can decrease the amount of resources required to confidently identify a command or input (e.g., requires less processing power) yet increase the speed of analysis. Further, because there may be a limited number of commands/inputs for the device, the device may be able to confidently identify a word spoken by a user as an input to the device utilizing an adjusted degree of certainty. Further, because various inputs can be combined, the quality of elements needed to capture that information can be lower than would be needed if only one type of input was utilized, such as by using a lower resolution camera than would be required if only lip movement were analyzed or using a microphone with a lower sampling rate than would be needed if only captured speech and/or audio data were used for analysis.

The ability to improve the accuracy of identifying inputs by combining multiple types of input and/or reducing the number of words to be analyzed to a relatively small number can also be beneficial in other ways as well, as a user may no longer have to go through a speech recognition "training" program as is typical for conventional speech analysis programs. In many conventional approaches, the user must speak a long list of words containing different sounds, which is used to build a user-specific speech model that includes information for various pronunciation or inflection aspects of the user's speech. Users often do not enjoy this process and may not use such approaches with devices such as portable media players or video games where the user wants to begin using the device immediately. Enabling input to be provided with less precision by reducing the likelihood of improper speech determination can enable general models to be used for speech input, such that users can begin using the device with little to no initial training or setup. Further, the device in some embodiments can analyze the user's speech over time to develop a user-specific speech model that can include information that is otherwise obtained in conventional systems using the training program.

Various other types of user input can be used to increase the accuracy of identifying an input/command for the device. For example, a user in some embodiments can perform specific gestures along with the speech and/or mouth movement, such as by making a swiping motion using one of the user's hands along with saying "Next page" when reading an electronic book on the device. In other embodiments, a computing device can determine a gaze direction of the user, or otherwise determine an approximate region or location of a display at which the user is looking, in order to further limit the dictionary to be used in analyzing the speech. For example, if a user is looking at a "Pictures" icon displayed on a device, the device can determine that it is likely that the user is interested in viewing pictures stored on the device (or at least accessible via the device) and launch a picture viewing program, go to a pictures folder and so on.

Further, in some embodiments a user can capture at least one image of an object, location or other such element, and an identification of the element can be used to assist in determining speech content, as well as determining at least one aspect of the corresponding input. For example, the user can take a picture of a product in a store and ask the device to "Find price." By taking a picture of the product, a dictionary containing words relating to a product can be selected, which can include words such as "Price." For example, if the device analyzes the image data to determine that the product is a book, the device can adjust the dictionary to focus on, or narrow to, terms relating to books. Further, the computing device can identify the product and use that identity to look up the price in response to the command. Other inputs can provide similar functionality such as a determined location of the person or device being used to select an appropriate dictionary (e.g., a dictionary appropriate for an airport or restaurant). Other inputs that provide context, such as the orientation of the device, a detected ambient temperature, a detected ambient noise level or time of day, among others, could also be used to select an appropriate dictionary.

In some embodiments, the video and/or image information captured by a device can enable the device to determine which person provided the speech. The device in some embodiments can handle the speech differently based upon the speaker, such as by ignoring speech by anyone other than the primary user of the device. In other embodiments, the device can identify each person, such as by using facial recognition software or identifying a device associated with each person, and can process the speech data based at least in part upon the identity. In some embodiments, input to the device (or certain types of input) is limited to certain persons, while in other embodiments any person can provide input to the device. The identity of the user providing input may be tracked and associated with that input.

In some embodiments, a device can learn to associate various gestures or movements with commands, such that a device can accept input based upon movement, word formation or gestures, without needing to receive corresponding audio input or being able to identify captured audio data such as where there is a lot of background noise or the sound quality is otherwise poor. For example, a user reading a book on their device at a library could move their lips to turn the page without saying the command "Next page" aloud.

Various other applications, processes and uses are presented below with respect to the various embodiments.

FIG. 1 illustrates an example of a computing device 100 that can be used in accordance with various embodiments. Although a portable computing device (e.g., a smart phone, an electronic book reader or tablet computer) is shown, it should be understood that any device capable of receiving and processing input can be used in accordance with various embodiments discussed herein. The devices can include, for example, desktop computers, notebook computers, personal data assistants, cellular phones, video gaming consoles, television set top boxes and portable media players, among others. In this example, the computing device 100 has a display screen 102, which under normal operation will display information to a user facing the display screen (e.g., on the same side of the computing device as the display screen). The computing device in this example includes at least one image capture element 104, each positioned on the device such that at least a portion of a user (not shown) operating the computing device 100 is imaged by at least one of image capture elements 104. Each image capture element 104 may be, for example, a camera, a charge-coupled device (CCD), a motion detection sensor or an infrared sensor, among many other possibilities. The computing device also includes at least one microphone 108 or other audio capture element capable of capturing audio data, such as words spoken by a user of the device. In this example, microphones 108 and 114 are placed on the same side of the device as the display screen 102 such that at least one of microphones 108 and 114 will typically be better able to capture words spoken by a user of the device. In at least some embodiments, at least one microphone can be a directional microphone that captures sound information from substantially directly in front of the device and picks up only a limited amount of sound from other directions, which can help to better capture words spoken by a primary user of the device.

As shown in FIG. 1, in one example, device 100 utilizes outputs from at least one of audio capture elements 108 and 114 and image capture elements 104 to assist in determining speech content. For example, if, while holding device 100, a user grips device 100 such that at least a portion of a user's hand is positioned over audio capture element 114, device 100 will utilize image capture element 104 and audio capture element 108 to assist in determining speech content. In other example embodiments, device 100 includes any number of image capture elements and audio capture elements each placed anywhere on device 100 to assist in determining speech content/user input.

Figure 2:
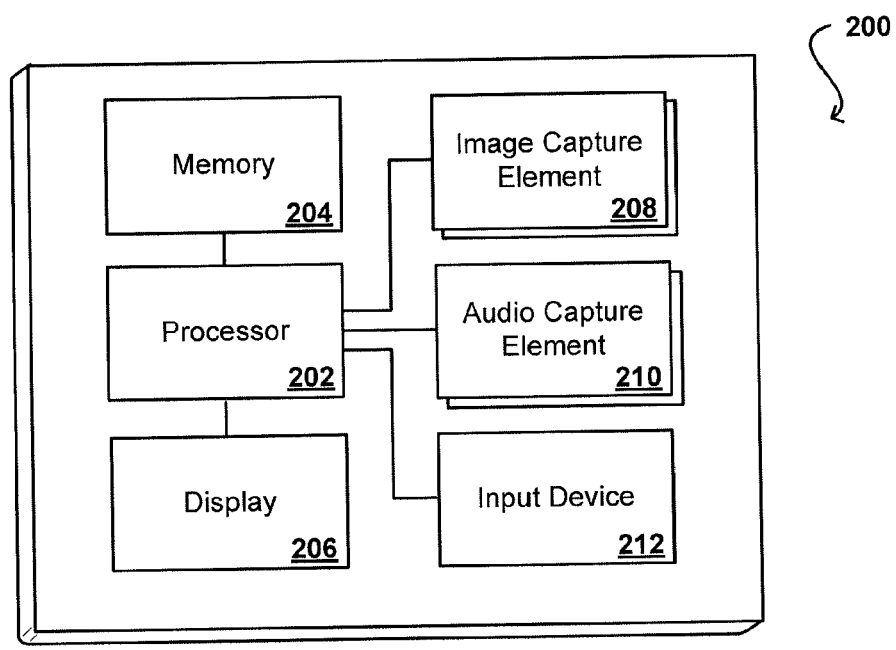
FIG. 2 illustrates example components of a computing device such as that illustrated in FIG. 1.

FIG. 2 illustrates a set of basic components of a computing device 200 such as the device 100 described with respect to FIG. 1. In this example, the device includes a processor 202 for executing instructions that can be stored in a memory device or element 204. As would be apparent to one of ordinary skill in the art, the device can include many types of memory, data storage or computer-readable media, such as a first data storage for program instructions for execution by the processor 202, a separate storage for images or data, a removable memory for sharing information with other devices, etc. The device typically will include some type of display element 206, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 208, such as a camera that is able to image a user (e.g., a facial region of a user) or other people or objects in the vicinity of the device. The image capture element can include any appropriate technology, such as a CCD image capture element having a sufficient resolution, focal range and viewable area, to capture an image of the user when the user is operating the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, an application or retrying to determine an audio input or other device. The device may also include the ability to retry to determine a user input.

As discussed previously, the device also can include at least one audio capture element 210, such as a microphone embedded in, or external to, the computing device. The audio capture element can be any appropriate element, such as a dynamic, condenser, capacitor or piezoelectric microphone that is substantially uni-directional or omni-directional in nature. In some embodiments, the device can include at least one additional input device 212 able to receive conventional input from a user. This conventional input can include, for example, a push button, touch pad, touch screen, wheel, joystick, keyboard, mouse, trackball, keypad or any other such device or element whereby a user can input a command to the device. In some embodiments, however, such a device might not include any buttons at all and might be controlled only through a combination of visual and audio commands such that a user can control the device without having to be in contact with the device.

FIG. 3(*a*) illustrates an example configuration 300 in which a user 308 of a computing device 302 can provide input to the device in accordance with one embodiment. Although the user is facing forward in this figure for purposes of clarity, it should be understood that in general the user would be facing the device. In this configuration, an image capture element 304 is on the same general side of the computing device 302 as a display element such that when the user 308 is viewing the display element, the image capture element has a viewable area or viewable range 312 that, according to this example, includes the face of the user 308. While in some embodiments the image capture element is fixed relative to the device, in other embodiments the image capture element can be operable to track the position of the user, such as by rotating the image capture element or an optical element (e.g., lens, mirror) that directs light to the image capture element. Although embodiments described herein use examples of the viewable area including the face of the user, the viewable area may include other portions of the body such as arms, legs and hips, among other possibilities. In either case, the viewable area of the image capture element can be configured to obtain image information corresponding to at least a portion 314 of a user operating the device, and if the image capture element is continually (or at least substantially continually) capturing or otherwise obtaining image information, then any movement of the user 308 relative to the device 302 (through movement of the user, the device or a combination thereof) can be captured by the image capture element 304.

If the device includes software and/or hardware that is able to locate at least one feature of the user that can be consistently determined, such as the eyes, nose or mouth of the user, then the device can analyze the image information to determine relative motion over a period of time and utilize that relative motion as input. For example, if the device can determine the location of the user's mouth in the captured images, the device can monitor the movement of the user's lips in order to attempt to determine any words, characters or other information spoken by the user. Similar to a user speech model, a user word formation model can be used, developed and/or refined that models how a user forms certain words using the user's lips, tongue, teeth, cheeks or other visible portions of the user's face. While some models may utilize only lip movement, any of these and other movements can be modeled as well. As discussed below with respect to a speech recognition model, a general word formation model can be used initially, and the words spoken and formed by the user can be used to refine the model over time to accurately predict and/or determine content of various speech based at least in part, or even completely, upon the movement of the user's facial features (e.g., lips) while forming those words.

In some embodiments, a computing device 302 can determine and track an approximate area or region of interest 314 corresponding to the user's mouth in the captured images such that an algorithm of the computing device only has to analyze image data corresponding to that region, which can significantly reduce the amount of processing needed for images, particularly for high resolution, full color images. In other embodiments, the device can track information such as the general location and position of at least one aspect of the user, such as the user's eyes, whereby a movement or gesture on the part of the user can also be detected and/or determined.

For example, a user can tilt the device or rotate the user's head, such as to nod up and down, in a "yes" motion. Such motion can be detected and analyzed by the image capture element (e.g., a camera) 304, as the position of the user's eyes in the viewable area will move in the images. Further, aspects such as the imaged shape, size and separation of the user's eyes also can change. Movement of the eyes in the viewable area could also be accomplished by moving the device up and down while the user remains still, as well as through other such motions. In some embodiments, device 302 is able to distinguish between movement of the user and movement of the device, such as by detecting movement of a background or other aspect of the images, by analyzing the separation, shape or size of various features or using movement sensing elements such as an accelerometer. Thus, in embodiments described herein that use the image capture element 304 to determine an orientation or location of the device relative to its user, a user can have an option of inputting a given type of motion which corresponds to a specific command by moving the device, altering an aspect of the user or both. Further, the audio signals can be analyzed along with the image data to determine the desired action (e.g., a nod and a "yes" voice command together can be used to indicate the acceptance of an action or command).

The example computing device 302 also includes at least one audio capture element 306 able to capture speech corresponding to the user. Suppose, for example, a user issues a voice command "Save file" while operating the device. The vocal command can be captured by the at least one audio capture element 306. Devices and algorithms exist today that enable recorded speech to be analyzed in an attempt to determine the words that were spoken. As discussed above, however, simply relying upon audio information can lead to uncertainties and incorrect determinations in a number of different cases. In contrast to these conventional devices, the computing device 302 described herein is also able to capture image information corresponding to the user at substantially the same time as capturing audio data, such that the analysis of the audio and the analysis of the video data can be combined to increase the accuracy of the determination.

Figure 3A:
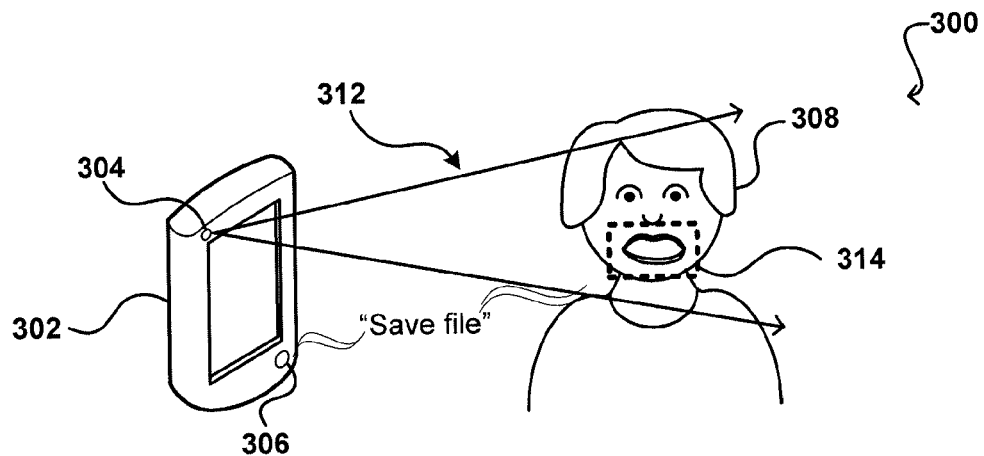
FIGS. 3(a), 3(b) and 3(c) illustrate examples of a computing device capturing image information and speech information corresponding to a user of the device in accordance with various embodiments.
Figure 3B:
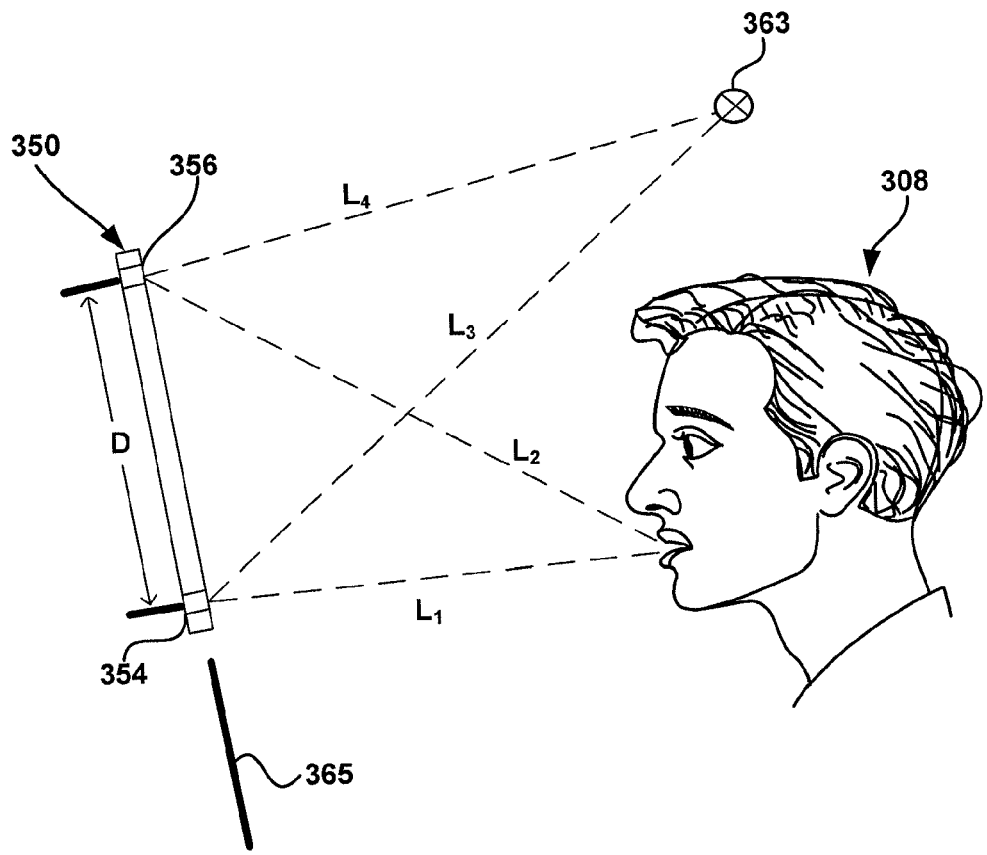

FIG. 3(b) illustrates an example configuration of device 350 that utilizes at least two audio capture elements 354 and 356 to determine a user input of the user 308. In one example embodiment, device 350 analyzes the outputs from audio capture elements 354 and 356 to identify a location or spatial positioning (e.g., a distance and/or orientation) of user 308 relative to device 350. More specifically, device 350 includes a plurality of audio capture elements configured in an array to function as a beamformer (not shown). As known to those skilled in the art, a beamformer captures the audio output in determining location information of user 308. Utilizing the location information of user 308, the beamformer can also reduce or eliminate audio signals from sources other than user 308, for example noise source 363. More specifically and in one example embodiment, device 350 uses a primary audio capture element 354 and a plurality of secondary audio capture elements 356 in the audio capture element array or beamformer. Audio capture elements 354 and 356 function to obtain audio from one or more users and determine where the audio is originating. In one example embodiment, audio capture elements 354 and 356 are arranged in an array pattern where the elements 354, 356 are separated by a defined distance, D, along a single plane 365. When audio is emitted from user 308, audio capture elements 354 and 356 each receive the audio from user 308. The audio signal transmitted from user 308 travels along path L1 to audio capture element 354 and along path L2 to audio capture element 356. Knowing distance D and that the speed of sound is roughly 343 m/s, device 350 determines the location or spatial positioning of user 308. For example, if device 350 is angled with respect to user 308 such that audio capture element 356 is 10 cm farther from user 308 than audio capture element 354, the audio signal emitted from user 308 will be received by audio capture element 356 will be delayed in time by approximately 0.29 millisecond. In another example embodiment, device 350 includes additional audio capture elements (not shown) arranged in the audio capture element array allowing for electronic focusing, or steering, of the audio capture element array to more precisely determine the position of user 308. More specifically and as known by those skilled in the art, the audio capture element array may be steered to generate more accurate spatial/location information of the audio signal emitted from the user. In addition to utilizing the audio capture element array, one or more Kalman filters may be used, in other example embodiments, to optimize or minimize errors of signals. By integrating a Kalman filter into the array, a least means squared focus analysis can be used to optimize the audio capture element array in terms of delays. As known to those skilled in the art, this focuses the receive directionality of the array to most effectively receive audio signals originating in a particular direction (e.g., from user 308) and can ignore or filter signals from other sources (e.g., noise, other audio sources). In one embodiment, location information from the array is used to alter the direction of the image capture elements 360, 362. For example and as shown in FIG. 3(c), if the audio signal of user 308 is being emitted from a position that is down 20 degrees and 15 degrees to the right (with respect to a known position on device 350), image capture elements 360, 362 could be directed or focused on this location to improve the captured image.

Device 350, in one embodiment, may also analyze the outputs of elements 354, 356, 360 and 362 to determine a relative location (e.g., a distance and/or orientation) of user 308 relative to device 350 to identify at least one of the proper audio capture element (e.g., microphone) 354, 356 and/or image capture element 360, 362 to use to assist in determining the audio content/user input. For example as shown in FIG. 3(c), path 370 between element 354 and user 308 is shorter than path 372 between element 356 and user 308 such that the outputs of elements 354 and 360 may produce outputs greater than or equal to the outputs of elements 356 and 362. In additional embodiments, device 350 may include other distance determining elements (not shown) to determine a relative distance between one or more of elements 354, 356, 360 and 362 and the user to select the appropriate audio capture element and image capture element. Known distance determining elements include ultrasonic, laser and other know distance measuring elements. In further embodiments, device 350 may also utilize the outputs from audio and image capture elements 354, 356, 360 and 362 to alter at least one of a gain of the audio captured from at least one audio capture element 354, 356 and at least one of an image characteristic of the output from the image capture element 360, 362 including, for example, an amount of zoom, brightness, contrast and other visual characteristics of the image output. In some embodiments, device 350 may disable or turn off unselected capture elements to reduce power consumption. In other embodiments, the outputs of each type of capture element (e.g., all audio capture elements) having an output meeting or exceeding a threshold level can be combined to improve the accuracy of the speech content/user input.

Figure 3C:
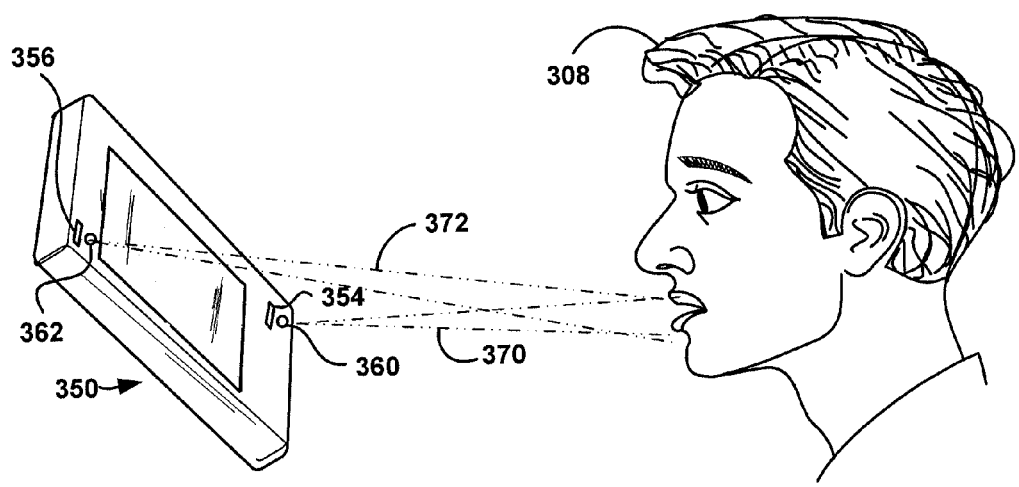
Figure 4:
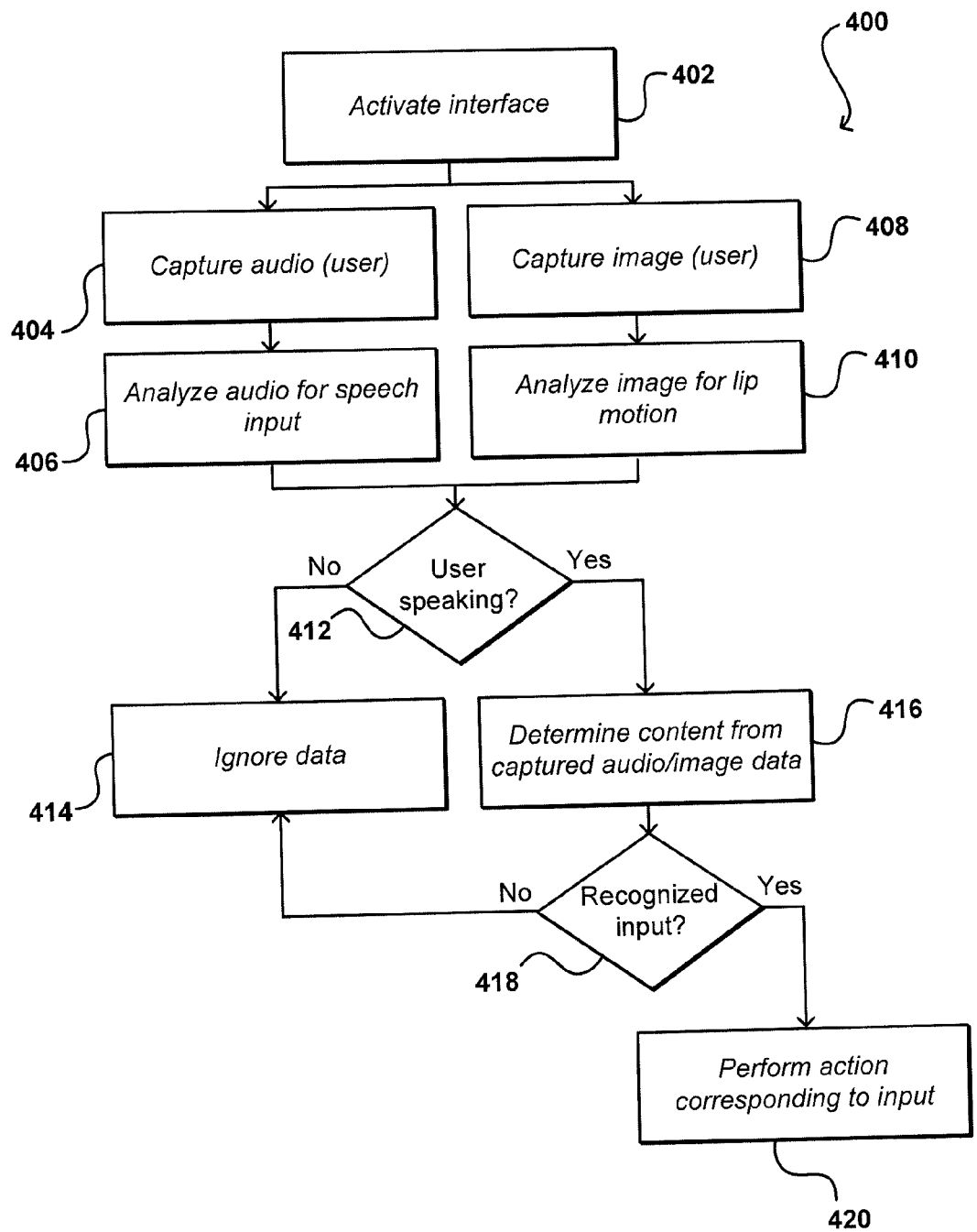
FIG. 4 is a flow diagram illustrating an example process for determining user input in accordance with one embodiment.

FIG. 4 illustrates an example process 400 for controlling an interface (or otherwise providing input) using a device such as that described with respect to FIGS. 3(a)-3(c). In such a process, an interface on the device is activated 402, either automatically or manually, using any appropriate technique for activating or executing such an interface. At substantially the same time in this example, the device begins recording audio 404 and capturing video in a direction of a typical user 408, the audio including words spoken by the user. In some embodiments, the device is in an "active listening" or similar mode, wherein the device does not attempt to analyze captured audio or video data unless the volume of the audio reaches a minimum level, a minimum amount of motion is detected in the captured video or some other such threshold is reached. In other embodiments, the device can continually, periodically or at any other appropriate times analyze the captured audio for speech information 406 and/or monitor the video for lip motion 410 or some other such motion or gesture as discussed elsewhere herein. In some embodiments, video data is captured and/or analyzed only once sound of a minimum volume level is detected in order to reduce the drain on resources that would accompany capturing and analyzing video to assist with voice recognition or input when no words or commands are being spoken. In other embodiments, the video data is captured and analyzed once the sound of a defined or selected pitch, timbre or other criteria is detected.

As the data (audio and/or video) is being analyzed, or after at least some initial analysis, a determination is made as to whether the user is speaking. This can involve any of a number of different factors, such as audible speech being captured and determined via one or more audio analysis algorithms and utilizing one or more image analysis algorithms to determine that the user is the person speaking at substantially the same time the speech was captured by the device. In some embodiments, the device may determine 412 that the captured audio contains speech from someone other than the user based at least in part upon analyzing the captured video information and determining that the user's lips were not moving at the time the audio data was captured by the device. In this instance, the device may not further analyze the captured audio data to identify whether the speech contained an input or command.

In some embodiments, an initial algorithm is used to analyze the audio data for at least one of a group or set of defined different triggers, such as a level of volume or the detection of frequency patterns that likely correspond to speech. In some devices, these types of determinations can be made at least partially through hardware, such that system memory and processing resources are not consumed analyzing the audio and/or video until audio patterns exhibit at least one specified property. Audio data captured by the device can be buffered for a short period of time such that recent audio data (e.g., audio captured over the last second) can be analyzed once a speech pattern is detected in order to avoid missing the first part of a spoken command, etc. In other embodiments, the audio and/or video are continually analyzed, at least while the device is in a certain mode or at a certain interface state, to detect any audio or video command. If the audio data captured by the device does not contain speech data and/or the speech data identified within the captured audio is determined to not correspond to the user (or other identified or authorized person as discussed elsewhere herein), the audio and video data captured by the device can be ignored and/or discarded. In some cases, a device buffer will be a first-in-first-out (FIFO) buffer of a certain size such that the audio and/or video data is routinely discarded after a period of time or as the buffer fills up unless that data is pulled from the buffer for analysis. Various other approaches to buffering, caching or otherwise temporarily storing content can be used as well within the scope of the various embodiments.

If a determination is made that the captured audio likely corresponds to user speech, as may, for example, be identified by a combination of detecting speech patterns in the captured audio that correspond to movement of the user's lips at the same time, one or more algorithms can attempt to determine the content of the captured speech data 416. As discussed later herein, approaches in accordance with other embodiments also can attempt to determine content or other user input or commands based only on captured video data, such as by analyzing the mouth movement of the user or analyzing gestures or movements made by the user. In other embodiments, a device can identify an input/command for the device based only upon the captured audio, such as where the quality of the captured video, by itself, cannot be used to identify an input/command (e.g., due to low lighting or frequency movement of the device). The algorithms may also be used to identify one or more sounds and/or images to identify a user.

Once the content of the captured audio and/or video information (e.g., the words spoken and/or gestures made) is determined, the device determines whether the content corresponds to a recognized input 418 or is otherwise something that likely was intended for capture by the device. For example, a user might be talking on the phone in the same room as the device, and the random conversation would likely not include enough trigger words to cause the device to perform any actions (unless the device is in a "transcribe all" or other such mode). If the user is looking at the device and says something like "Open file," for example, that phrase and/or those words can be detected by at least one algorithm as corresponding to an input command to the device, whereby the device can take one or more appropriate actions. If no such commands or recognized input are detected, the data can be ignored and/or discarded 414. Also, in some embodiments, the algorithm, utilizing an altered confidence threshold, retries to recognize the user input. Otherwise, the device can take the appropriate action(s) for the detected commands and/or input 420.

As mentioned, a computing device in many embodiments may analyze detected speech input to determine whether the detected speech contains any words (or other sounds or content) that correspond to an input for a current state of the device or an interface on the device. For example, FIG. 5(*a*) illustrates an example state 500 wherein a user is at a relatively top-level state of a hierarchical interface, such as an initial display page, displayed on the computing device 502. In this example, the user has four possible options 504, with each option having a corresponding word or "trigger." For example, the user might say the word "Web" while looking at the device in order to open an Internet browser or say the word "Photos" to open up an image gallery on the device. In some embodiments, the device will only accept a spoken word as an input to the device if the user is looking at the device in order to prevent inadvertent operations, such as playing a music file any time the user says the word "Music" within a given distance of the device. In other embodiments, the user might also have to say another word in combination with the command, such as "Go Web" or "Web, please," in order to reduce the likelihood of inadvertent input. The user of the device may also alter the interface to display selected or defined words as desired by the user for certain commands or actions. For example, by replacing "Web" in the previously described example with "Net," the Internet browser opens when determined user input is "Net."

In still other embodiments, the user might perform a particular gesture or movement while saying the command, such as nodding or pointing toward the device. In such an embodiment, several sensory inputs are utilized by the device to identify whether the user provided a command: captured audio is utilized to detect an audible command and captured video is utilized to determine that the user (i) said that word based upon image analysis of the user's face and (ii) performed an appropriate gesture. The video of the user's face and gestures may be based upon video captured from the same or different image capture elements. In some embodiments, two of these three sensory inputs might be sufficient to identify an input or command, such as by mouthing the word and making the gesture, when the user does not want to audibly speak the command (e.g., the user is in a library). In other embodiments, the device might accept any one of these sensory inputs, particularly where there is a way to otherwise identify the user (e.g., facial recognition, voice recognition, retinal scanning or other biometric information).

Figures 5A, 5B:
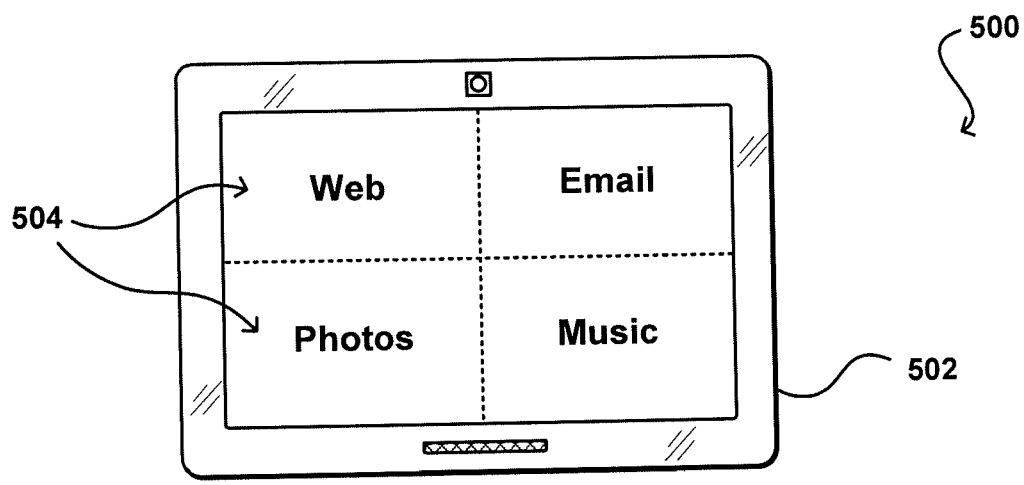
FIGS. 5(a) and (b) illustrate examples of dictionaries that can be used with various device or interface states in accordance with various embodiments.

The ability to predefine a set of actionable words (e.g., inputs or commands), such as is illustrated in FIG. 5(a), can significantly decrease the amount of resources and the amount of analysis time needed to analyze the audio and/or video data and identify an input because the content of the captured audio/video data only has to be matched against the predefined set of actionable words, as opposed to having to be potentially matched against millions of words in a general-purpose dictionary. Further, the device can include, obtain or develop a different dictionary (or sub-dictionary) for each of a plurality of different states. For example, FIG. 5(b) illustrates an example table 550 containing two sub-dictionaries, one to be used when the user is interacting with a general interface page and another to be used when the user is interacting with a Web browser. As illustrated, certain words (e.g., "Close" and "Options") might be common to both dictionaries, while other words (e.g., "Documents" for a general interface and "Home page" for a Web browser) might be unique to a given sub-dictionary. As discussed, limiting the number of words for a given state can simplify the matching and analysis process in a number of different embodiments.

Another advantage to utilizing relatively focused sub-dictionaries for a current state of the device is that the confidence levels required to determine whether captured audio and/or video contains an input can be lowered and/or less training time is needed for each user. For example, as discussed above, predefining the words that act as an input to the device reduces the likelihood that a word that sounds similar to a predefined input word will be mistaken by the device as an input word. An additional advantage to predefining the input words (or combinations of words) for the device is that a user does not have to go through a lengthy training process in order to enable the device to track speech patterns and inflections that are unique to that user. In an example such as FIG. 5(a), where there are very few options, which are pronounced very differently, a basic or general speech model can be used that will correctly identify the speech input for almost any user, regardless of accent or other potential speech peculiarities.

In some embodiments, a user does not have to go through a formal speech training process in order for the device to recognize input words provided by the user. By taking the user through a number of interface states that each have only a fixed number of words, the device can not only properly interpret the commands provided, but can also capture speech information for the user that can be used to customize or develop a user-specific speech model that can be used to determine other words that might be provided by the user as input at a different time. For example, the user might open up a word processing program and want to use the device for dictation purposes. Because potentially any word can be provided as input in such a situation, the device typically will need to have some training or user-specific model or information in order to be able to properly interpret the speech information. If, however, the user has utilized the device for a period of time and issued several state-specific commands that were properly interpreted by the device, the device may have developed a user-specific speech model unbeknownst to the user, which can then be used and/or refined as would a traditional speech model developed using a conventional training method. In another example using the described algorithms, if, while reading a page of text, a user asks for a definition of a word on the displayed page, the sub-dictionary used by the algorithm would be limited to those words currently displayed. This limited sub-dictionary would reduce the time and likelihood of errors because of the substantially the smaller size.

In some embodiments, the device can highlight any word that falls outside the level of confidence and can ask the user to repeat that word (to determine/verify if correct). This can help to train the device in certain aspects of the user's speech on an as-needed basis. The user can also have the option of highlighting a specific word, such as by saying "Change" followed by the word, which can then enable the user to repeat the word until the device properly identifies that word. Upon proper identification, the information can be added to the model for that user.

Figure 6:
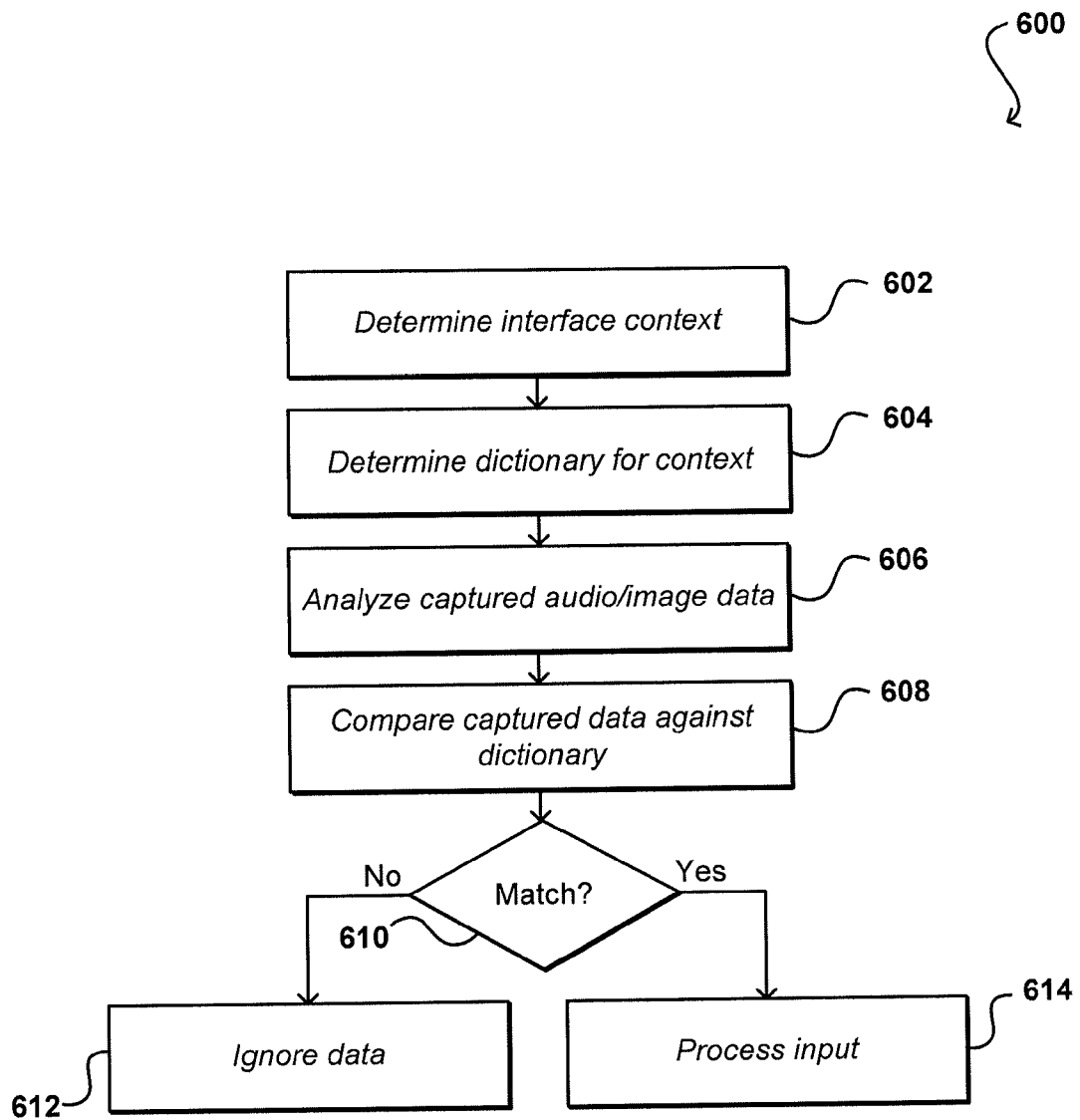
FIG. 6 is a flow diagram illustrating an example process for using a state-specific dictionary to assist with input determination in accordance with one embodiment.

FIG. 6 illustrates an example process 600 for determining user input based on state-dependent dictionaries in accordance with at least one embodiment. In this example, a context or state of a user interface (or the device running the interface) is determined 602, and the appropriate dictionary (or sub-dictionary) for that state is determined 604. Although illustrated as separate steps, it should be understood that such information could be determined through a single step or process. Further, as with all processes discussed herein, there can be additional, fewer or alternative steps performed in similar or alternative orders or in parallel, within the scope of the various embodiments unless otherwise stated. The device can identify words contained within the captured audio and/or video data 606 and can compare these words against the input words contained in the state-dependent dictionary 608. Upon matching 610 a word from the audio/video data with an input word, the input corresponding to the matched input word is processed 614 (e.g., launch browser, create calendar event). If no match is identified, the device may request the user to repeat a command, or the voice/audio data can be ignored or discarded 612 as discussed elsewhere herein.

Figure 7:
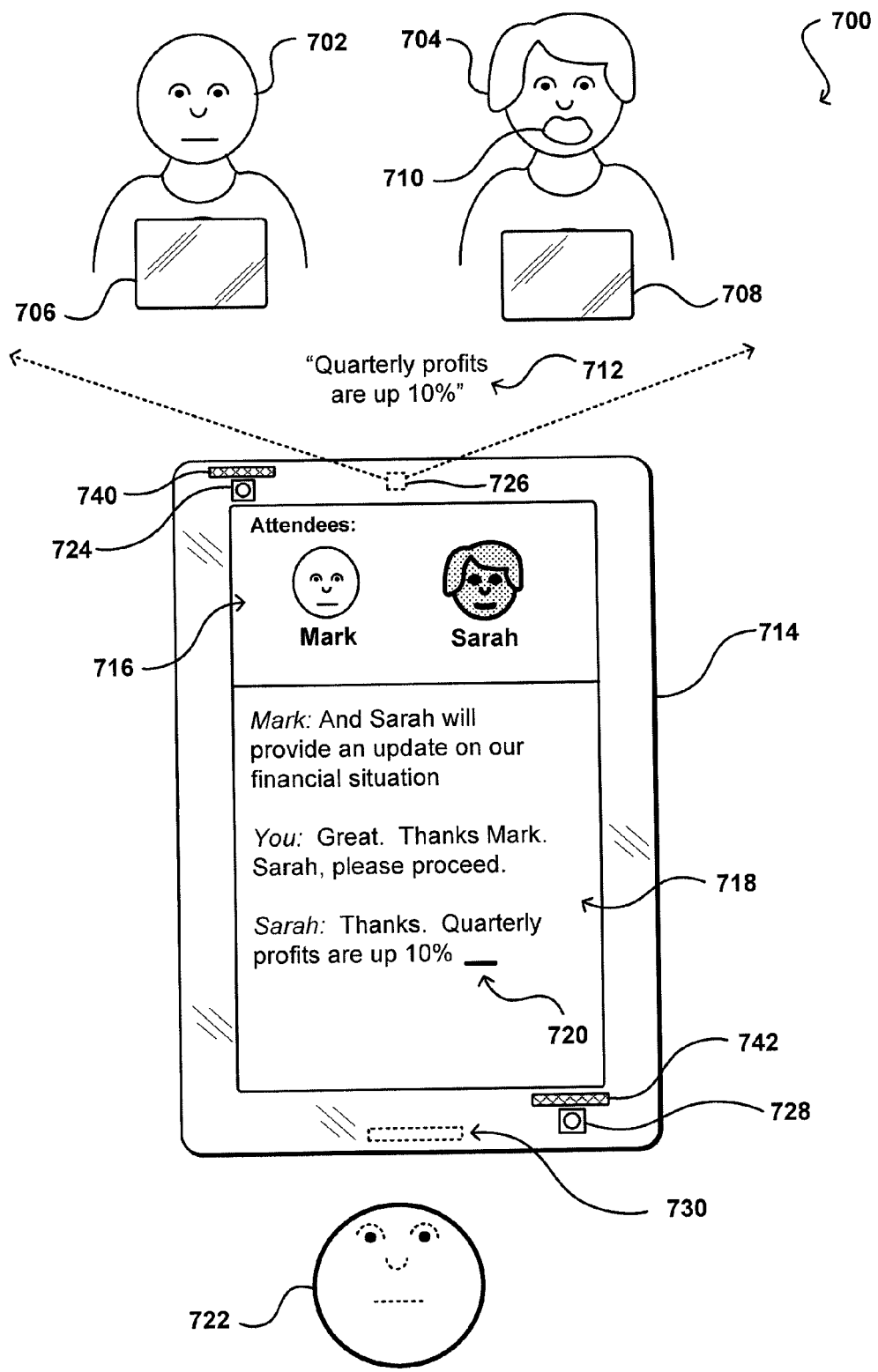
FIG. 7 illustrates an example situation wherein a computing device is able to determine who is speaking and interpret that speech, in accordance with one embodiment.

FIG. 7 illustrates an example situation 700 wherein a computing device is able to determine who is speaking and interpret that speech. In one embodiment, computing device 714 also includes at least one image capture element 726 positioned on the opposite side of the device from the display screen 718 such that the image capture element 726 captures image or video data of objects or persons on a side of the device substantially opposite to the relative position of a primary user 722 of the device. For example, if a user 722 is holding up the device 714 with the display screen 718 toward the user, image capture element or camera 724 could capture image information for the user of the device, and image capture element or camera 726 could capture image information for other persons in the general vicinity that are not on substantially the same side of the device as the user 722. In some embodiments, image capture element 726 can include at least one optical element, such as a wide-angle or fish eye lens, which enables image capture element 726 to capture images over a wide range of angles, such as 180 degrees or more. Further, each image capture element 724, 726 and 728 can comprise a digital still camera, configured to capture subsequent frames in rapid succession or a video camera capable of capturing continuous video.

This example computing device 714 also includes a secondary microphone 730 on the same side of the device 714 as image capture element 726. While a single microphone 740 can be used, a secondary microphone 730 can potentially increase the ability to pick up sound from persons on a side of the device 714 opposite the user 722. Further, the secondary microphone 730 can be a wide angle microphone operable to capture audio from substantially any direction about the computing device 714. Another potential advantage to such a configuration is that the audio captured from the secondary, wide angle microphone (or an omni-directional audio capture element) 730 can be subtracted or otherwise removed from the audio captured by a directional microphone 740, 742 facing the user 722, such that sounds not corresponding to the direction of the user (e.g., background noise) can be filtered out from the audio before analysis. The device can also include one or more algorithms or mechanisms for recognizing and differentiating human voice waveforms from other waveforms in order to help determine which portion(s) of the audio to analyze. It should be understood that different computing devices can include any appropriate number of image capture elements (e.g., one or more), any appropriate number of audio capture elements (e.g., one or more) and any appropriate number of audio and/or image analysis or filtering algorithms in accordance with various embodiments. In another example embodiment, secondary microphone 730 may include a plurality of microphones, similar to audio capture elements 354, 356 and may be configured as an audio capture element array or beamformer. The array may also be used to provide improved spatial information about other signal sources located on a side of the device 714 opposite user 722.

In many embodiments, the device may capture audio containing speech and/or video data containing images of persons other than the primary user of the device. For instance, consider the example situation 700 of FIG. 7, wherein there are three people in a meeting, including the primary user 722 of a first computing device 714 (the "user device" in this example) and two other persons (here, Mark 702 and Sarah 704) each (potentially) with their own second device 706, 708, respectively. The devices in this example can be the same or different types of devices with similar or different capabilities. The user device in this example has a first image capture element 724 able to capture images of the user 722 and a second image capture element 726 on the other side of the user device able to capture image data including images of Mark 702 and Sarah 704 located on the other side of the user device. During the meeting, the user device 714 may detect audible speech from the user(s), Mark and/or Sarah, either individually or at the same time. Thus, when the user device 714 detects audible speech, the user device can utilize one or more image algorithms to analyze the captured video data to determine whether the user, Mark or Sarah, provided the audible speech. For example, the user device 714 may utilize the one or more image algorithms to identify whether the user's, Mark's or Sarah's, lips were moving at substantially the same time as the audio was captured by at least one of microphones 730, 740, and 742 of the device 714. In this example, at least one of audio capture units or microphones 740, 742 capture audio from user 722, and audio capture element or microphone 730, located on the opposite side of the device as user 722, captures audio from Mark 702 and Sarah 704.

In the example provided in FIG. 7, Sarah is speaking at this point during the meeting (e.g., saying "Thanks. Quarterly profits are up 10%") 712, and the user and Mark are listening to Sarah. Thus, the user device 714, utilizing captured video data, identifies that Sarah's mouth 710 is moving at substantially the same time the as the audio data containing speech content was captured. The captured video data also indicates that the user 722 and Mark 702 are not speaking at that time because their lips are not moving. Thus, the device associates the speech with Sarah. In this example, the other users have been identified by the device, such as by detecting the devices 706, 708 associated with each person, performing image recognition, receiving input from the user 722 or any other appropriate determination technique. Further, the device can determine the approximate location of each person relative to the user device using image analysis techniques, triangulation or any other such process and can display icons, images, avatars or other such graphical representations 716 for the detected persons in a way that corresponds to the relative position of the persons with respect to the user device (which can be useful in meetings, presentations or other such settings). In this example, when the device detects that Sarah is speaking, the device can change the graphical representation 716 corresponding to Sarah.

Another advantage to such functionality is that dictation or transcription can be provided for meetings or other such situations, where the speaker can actually be identified automatically and associated with the proper speech. For example, the display 718 on the user device shows a transcription of a recent portion of the meeting. Because the user device is able to determine which person spoke each word, the device can list that person's name (or other identifier) next to each portion attributed to that person. The display can also include other elements such as a cursor 720 or other element indicating who last spoke and/or the last word that was spoken.

Determining identities for the persons and/or devices in the room, or otherwise nearby or within a detectable range, also provides a number of other advantages and input possibilities. For example, if the device knows that one of the nearby people is named "Sarah" then the device can add that name to the sub-dictionary being used in order to more quickly and easily recognize when that name is spoken. Further, if information associated with Sarah, such as a device identifier or email address, is known to the device, such as through contact information, various actions can be performed using that information. For example, FIG. 8(*a*) illustrates an example situation 800 wherein the user of the user device wants to send a file to Sarah. In some embodiments, the user could just say "Send to Sarah," and the device would know to send the current file being accessed on the user device to Sarah. In some embodiments, the user could make a gesture, such as to point to Sarah's location and just say "Send" or "Sarah" to accomplish the same function. Other similar motions can be used, such as "throwing" the file to Sarah or making any other such gesture or motion.

Figure 8A:
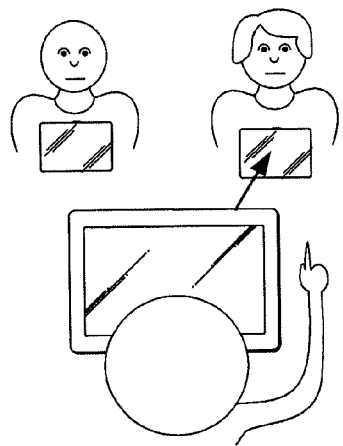
FIGS. 8(a), 8(b) and 8(c) illustrate examples of gestures that can be used along with speech to provide input to a computing device in accordance with one embodiment.
Figure 8B:
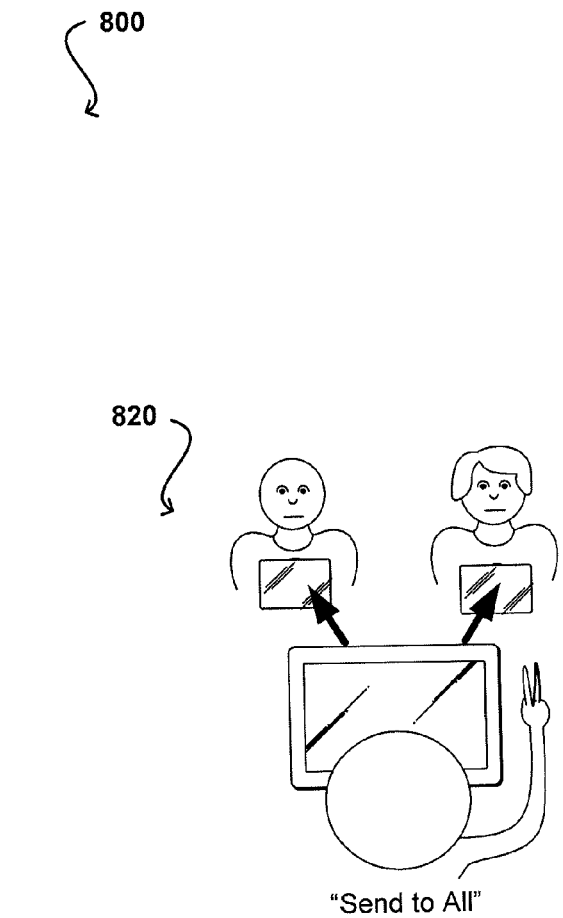
Figure 8C:
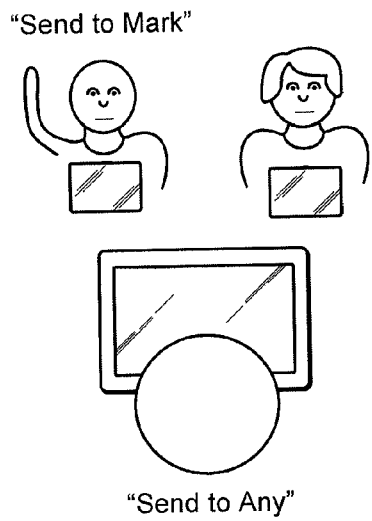

FIG. 8(*b*) illustrates another example situation 820, wherein the user wants to send the file to more than one person. In some embodiments, the user could specifically identify the people the user wants to receive the file. Using the FIG. 8(*b*) example, the user could say something like "Send to Mark and Sarah" to cause the current file or information to be sent to those people. In other embodiments, the user could say something like "Send to all" to cause the current file or information to be sent to everyone currently identified by the device (e.g., Mark and Sarah). A user may also use one or more gestures to send a file and/or information, such as to point to each person individually, point to each person at the same time using different fingers or to spread out all fingers as a gesture to "Send to all." Other gestures or motions can be used as well, such as to say "Send" while making a sweeping motion across the device, which indicates to send the file/information to all persons currently identified by the device. Various other options and inputs can be used as well.

In some cases, at least some of the input can come from the other identified persons. For example, in the situation 840 of FIG. 8(*c*) Mark is holding up his hand to designate himself as a recipient of a file that the user of the user device intends to send by saying something like "Send" or "Send to any," and the device recognizes, based on the combination of inputs (e.g., user's command plus Mark's action), to send the file to Mark. In some situations, where the user or user device allows for such commands, Mark can say "Send to Mark" or "Send to me" while making a gesture and the user device can send the file to Mark without the user having to speak or otherwise provide input. Various other gestures, inputs and combinations can also be used as should be apparent.

In situations such as a presentation where different users might present different portions of the presentation, the device can pass "control" between specific persons. For example, a user might point to another person and say something like "Transfer control to Mary" in order to pass control of the device. In some embodiments, the device can utilize image recognition or another such approach to ensure that the person providing commands to the device or receiving control of the device is authorized to do so. Such an approach can prevent other persons from inadvertently controlling the presentation and can minimize the work the device must do, as only commands presented by the person in control of the presentation will be processed. Further, when passing control of the device to a user located on a side of the device different from the current user in control, the device can activate, deactivate or change the roles of various input elements on the device, such as by turning on a camera on a first side of the device (corresponding to the person in control) and turning off a camera on the other side.

Figure 9:
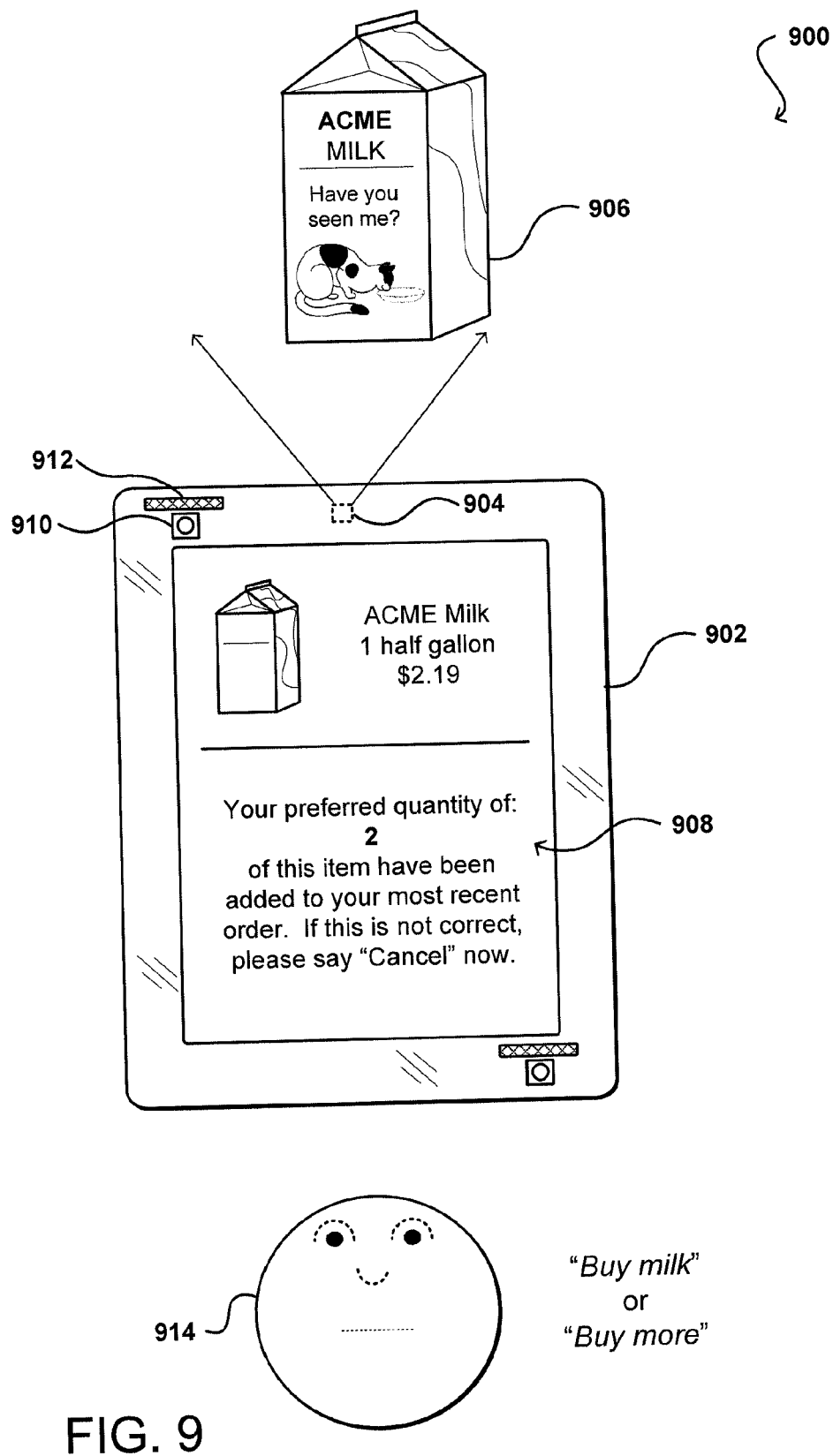
FIG. 9 illustrates an example situation wherein a computing device is able to utilize image information and speech or gesture information to perform a desired action in accordance with one embodiment.

Various other types of input can also be provided and used with speech and/or captured video information as discussed elsewhere herein. For example, a user can point an image capture element of a device at a certain object in order to provide a command that relates to that object. In the example situation 900 of FIG. 9, a user 914 wants to order another carton of milk. In this example, the user can orient the device 902 such that an image capture element 904 is able to capture a picture of the milk carton 906. While capturing an image of the carton, or using a captured image of the carton, the user can speak a command such as "Buy milk" or "Buy more," which can be detected and determined by the device using audio captured by a microphone 912 and video captured by a camera 910 using any approach discussed or suggested herein. Once the "Buy milk" or "Buy more" command is recognized by the device, the device can analyze the image of the carton using one or more image analysis algorithms, and can identify the milk carton.

In some embodiments, the device can also add milk to a shopping list or, in this example, actually purchase the milk on behalf of the user from an electronic marketplace. In this example, the device displays information about the product, here including an image and pricing information and provides purchase information 908 to the user that the item has been purchased, such as by using preference information previously entered by the user. In at least some embodiments, the user can also see an option to cancel the order in case the input was improperly determined. In some embodiments, the actual transaction might not be completed until a period of time has passed without the user canceling the input. In other embodiments, the user might also have to confirm the order, such as by saying "Purchase" or "Confirm," speaking a pay phrase, nodding the user's head in a "yes" motion or performing an appropriate gesture. In one example, another user input is "Compare Price" that obtains and displays prices for the product or service of interest.

In some cases, however, the user can associate information with the device such that the user does not have to point the device at anything in particular. For example, if the user has provided the device with purchasing information, the user might be able to say "Purchase milk" at any time and have the same result as in the example of FIG. 9. The user could perform any of a number of other such actions, such as to pay the cable bill by saying the phrase "Pay cable bill." Other inputs could be used to assure the intent of the speech in various embodiments. For example, if the device has a GPS or similar positioning system, then the device might not accept the "Pay cable bill" command when the user is away from home or may request confirmation from the user prior to paying the bill. If the device, through image analysis or another such process, determines that the user is sitting at the desk where the user always pays bills, then no confirmation or other input might be needed other than the appropriate phrase or gesture. Various other examples should be apparent in light of the teachings and suggestions contained herein.

For example, a user could use the device to capture an image of a menu or sign for a restaurant in order to obtain information about the restaurant. After capturing the image, the user could say "Get ratings" or "Make reservation" to obtain information about the restaurant named in the captured image. Similar input can be provided using a GPS or other location-determining element or mechanism of the computing device (e.g., magnetic sensing, laser range finding, ultrasound measurement, signal triangulation and other similar technologies). In some embodiments, a device that processes user commands or input of video and audio can be used in a vehicle, such as where a user may obtain information while driving the vehicle by saying something like "Find gas station," and the device can locate the requested information using a GPS system or other such device. As discussed, user recognition can be used such that the device can determine the destination when different drivers say "Work" or "Home," which could correspond to different locations for different drivers (or passengers).

Figure 10:
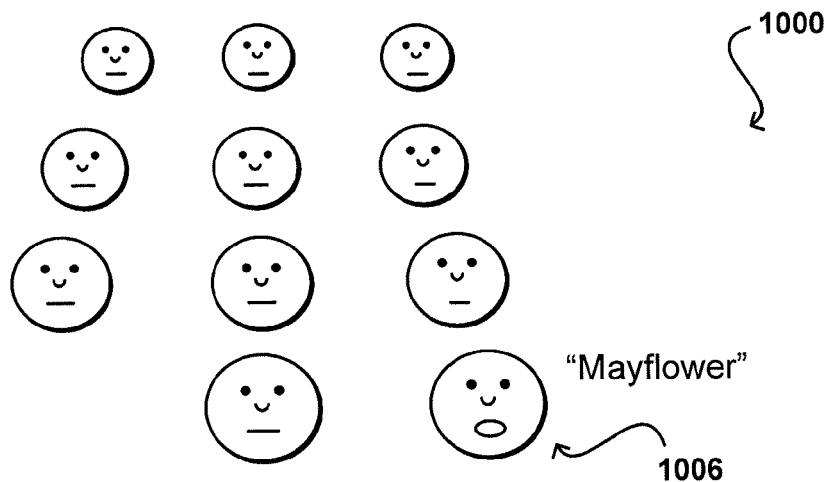
FIG. 10 illustrates an example situation wherein a computing device is able to determine who is speaking, interpret that speech and track information about that speech for a number of people in accordance with one embodiment.
Figure 10:
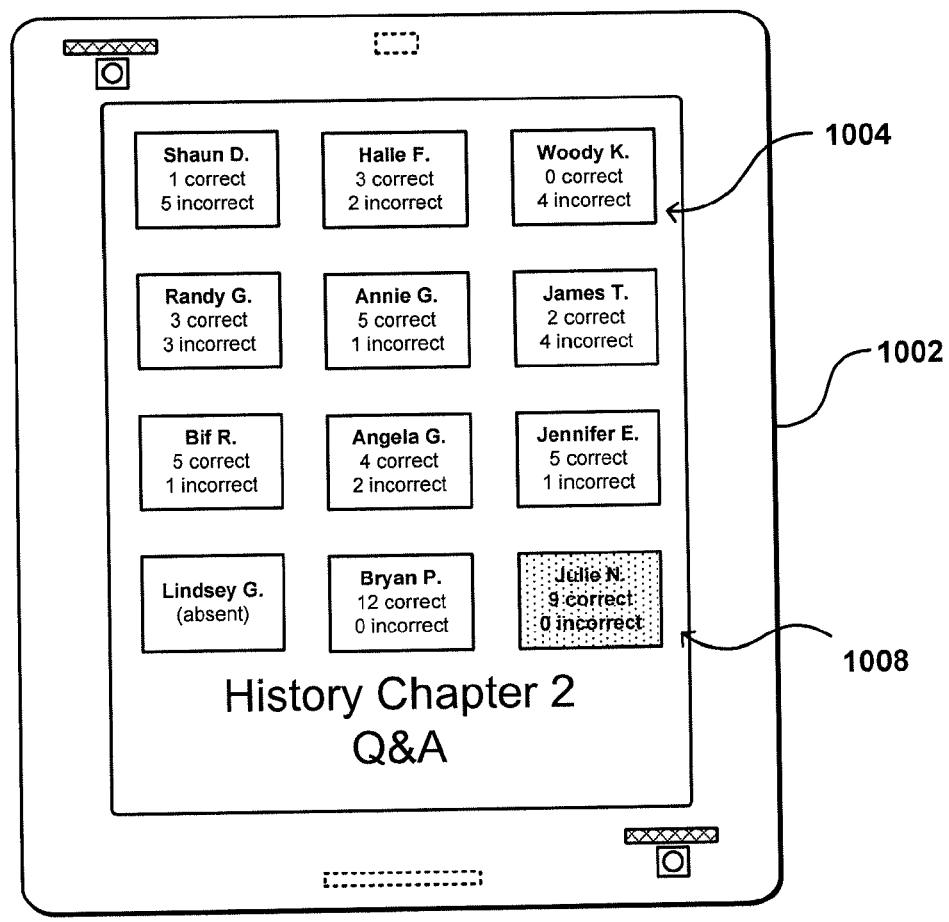

Approaches discussed herein can be used to perform any of a number of other tasks as well. For example, FIG. 10 illustrates an example situation 1000 where a computing device is used by a teacher in a classroom. Because the device can determine which student in the class is speaking, the device 1002 can determine which student is answering the question. In this example, student Julie 1006 is providing the answer to the teacher's question, as determined by the movement of her mouth captured by the image capture element and the audio captured by the audio capture element. If, after Julie's answer, the teacher says a command such as "Correct," the device 1002 can accept this input and record that Julie correctly answered the teacher's question. This would allow the device to track how well each student is performing, such as by recording the number of correct and incorrect answers provided by each student. The device can include icons 1004 or other graphical elements corresponding to each student, as may be determined using image analysis, device detection, manual entry or any other appropriate technique. When a student is answering, the device can manipulate the icon 1008 associated with that student, so the teacher can be sure that the proper student gets credit. If the questions are multiple choice, such that the student will respond with an answer such as "A," "B" or "C," then the device can determine whether the student answered correctly without any input needed by the teacher. Such an approach could allow student performance to be determined without the need for testing, as student performance can be determined and tracked on a daily basis. Further, the device can use an appropriate algorithm to ensure that students are offered similar numbers of questions with similar levels of difficulty, such as by manipulating the display of an icon for a student to be asked the next question. In some cases where students raise their hands to answer, a teacher would not even need to be present, as the device could ask the question, see who raised their hand first or call on the next person, determine whether the answer was correct and record the performance. Such an approach would be an objective way to teach or administer quizzes, without any potential favoritism, bias, discrimination or other such unfairness.

Figure 11:
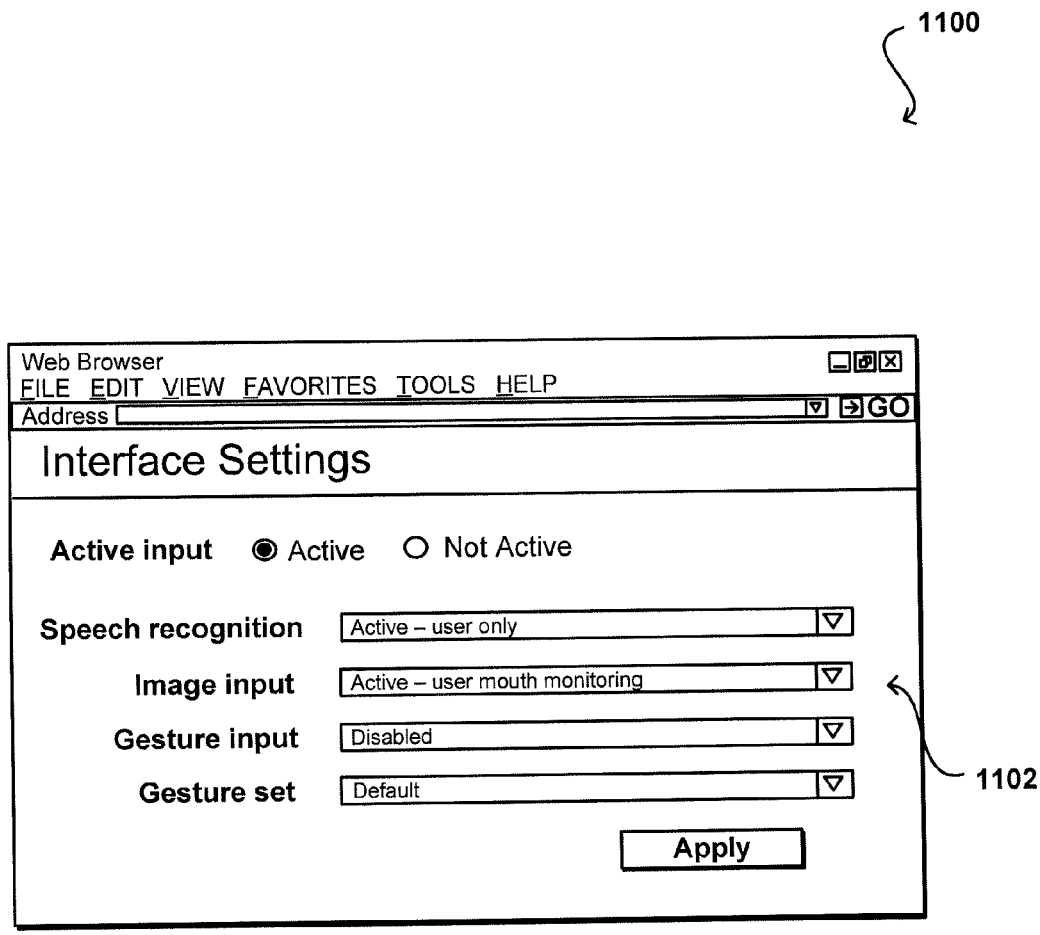
FIG. 11 illustrates an example configuration interface that can be used in accordance with one embodiment.

A user can enable and/or configure a variety of inputs and/or combinations to be used with a computing device in accordance with various embodiments. For example, FIG. 11 illustrates an example interface 1100 wherein a user is able to activate or deactivate "active" input or input provided by audio and/or video input. For active input, the user can specify options 1102 relating to types of speech input (e.g., who can provide speech input), image input (e.g., whose mouth should be monitored for speech) and/or gesture input. The user can also have the opportunity to select from certain sets of options, such as specific gestures to be used to correspond to certain inputs, or can develop customized inputs. For example, if every time the user says "Go," the user points to the screen, the device can be placed in a "learn" mode such that the gesture becomes associated with that command. At some point, either the command is only accepted when spoken in combination with the gesture and/or the command can be provided with the gesture only.

A device in certain embodiments can also utilize image and/or voice recognition to apply context to input provided by a user. For example, if a smart phone using the technology described herein is shared by two different users and one of those users say "Call mom," the device may identify the person that provided the command based on a combination of the captured audio data and video data and will dial the number for the mother of the person saying the command.

In some embodiments, a computing device can also potentially limit or adjust the dictionary used to analyze speech input by determining an approximate location or area on the device at which the user is looking. For example, during the image analysis process when a computing device is attempting to determine the lip movement or gestures of a user, another algorithm could attempt to determine an approximate gaze direction of the user. In one embodiment, the algorithm can analyze the user's eye movements over time to determine the approximate bounds of the gaze directions when the user is looking at the device and can interpolate locations in-between. If multiple cameras or image capture elements are used, techniques such as triangulation can be used to attempt to determine an approximate distance to the user. Such information can be used to determine an approximate location on the device at which the user is looking, such as a specific portion of an interface, a specific icon, a specific word or group of words, etc. If a user is looking at a specific group of icons, for example, the dictionary to be used in analyzing speech input can be adjusted based on anticipated user input. In some embodiments, no words or other elements of a dictionary for an interface or device state are removed, but the order in which the words are compared to the input speech data can be adjusted in order to process the most likely matches first. For example, if the user is looking at an email icon, the device might reorder the list to give priority to words or phrases such as "Read mail" or "Send message." Such an approach can also help improve speed, accuracy and adjust the user speech model as discussed elsewhere herein.

In one example, a portable computing device determines an approximate gaze direction and/or gaze position of one or more users (or viewers) with respect to the device. While a user is glancing at information displayed on a display element of the device, an image capture element of the device can capture at least one image of a user to determine the approximate gaze direction of the user, such as by using one or more image analysis algorithms as discussed elsewhere herein. The device can track changes in gaze direction using the image capture element (e.g., camera), as the position of the user's eyes in subsequently captured images (e.g., corresponding to a viewable area) move or are no longer contained within the area of the captured images. In addition to gaze direction, aspects such as the imaged shape, size and separation of the user's eyes can also be determined and monitored, which can provide information such as relative distance, identity or physical characteristics of the user.

A change in eye position in the viewable area could also be accomplished by moving the device up and down while the user remains still, as well as through other such motions. In some embodiments, the device can distinguish between movement of the user and movement of the device by detecting movement of a background or other aspect of the images or by analyzing the separation, shape or size of various features. Thus, in embodiments described herein that use the image capture element to determine an orientation of the device relative to its user, the tracking of information such as gaze direction can account for movement of the device, such that a change in gaze direction due to movement of the device relative to the user can be accounted for without inadvertently registering the change in gaze direction as a new input value. Other movement and orientation determining elements can be used as well as discussed elsewhere herein.

Another approach that can be used to determine gaze direction in accordance with various embodiments instead (or additionally) utilizes infrared (IR) radiation (or similar radiation having a wavelength that is not perceptible by the human eye) to illuminate at least a portion of the user and capture the reflected radiation. A particular advantage of IR radiation is that the human retina acts as a reflector with respect to IR, such that light from a given direction will reflect back in substantially the same direction but will not reflect back in a substantially different direction. This effect is similar to a red-eye effect in an image, where an image captured using a flash attached to the camera can experience the red-eye effect, but images captured from cameras at other angles with respect to the flash will not demonstrate the red-eye effect.

Using such an approach, a user can be illuminated with IR radiation from the device, such as by including at least one IR emitter in the device that will emit IR radiation that is not harmful to the user and further cannot be detected by the user during use. The device can also include at least one IR sensor for detecting IR radiation reflected by the user. One advantage of such an approach is that the IR components can be relatively low-power, as compared to illuminating a user with ambient light. Further, the images captured can have a relatively low color depth, similar to a grayscale image, such that much less processing capacity is needed than for analyzing full-color image analysis. In other embodiments, different techniques may be utilized to determine the gaze direction of a user. Additional information about approaches to determining gaze direction of a user relative to a computing device can be found, for example, in co-pending U.S. patent application Ser. No. 12/332,049, filed Dec. 10, 2008, entitled "Movement Recognition as Input Mechanism," which is hereby incorporated herein by reference.

As mentioned above, various approaches can be used to attempt to conserve resources such as power consumption, particularly for portable or hand-held devices. For example, a video camera (typically very power intensive) might not be activated until speech is detected. In other embodiments, a low resolution image capture element might be used to determine when a user is speaking or making a gesture, and a high resolution image capture element (or high resolution state of the same element) can be activated when needed for analysis. In some embodiments, an IR emitter and detector can be used to monitor the user's teeth (which will generally reflect IR) such that the device can detect when the user's lips begin to move using the lower-power IR element(s) and then activate an ambient light camera in response to the detected lip movement. In some embodiments, a standard image capture element can be used to continually (or otherwise) capture image information, but would capture this information as compressed data and the device would only decompress and analyze the data when certain rules or criteria are satisfied, such as audio speech patterns being detected. In some embodiments, the camera could be turned on when a user reaches a certain interface or state and might be turned off after a period of inactivity while other mechanisms (e.g., audio) are used to monitor user input. In some situations, the camera can turn off after the user reaches a certain state or begins a particular activity, such as reading an electronic book on the device, except where voice control is used to flip pages or perform other such activities. In some embodiments, IR can be used to monitor gaze direction, and the camera can be activated when the user is getting near the end of the page (and is likely to say something like "Flip" or "Next page." In some embodiments, the image analysis would begin after a defined or selected word or group of words are detected, thus reducing power consumption. Various other examples and approaches can be used as well within the scope of the various embodiments.

Various approaches discussed herein can also be used to provide various types of security. For example, a user might always perform a certain gesture when logging onto a computer, such that the computer learns to associate that gesture with that activity. Then, if an unauthorized user learns the phrase that the user uses to logon to the computer, such as by saying "Computer engage" or the user waving hand to the left, the computer will not actually logon unless that other user also knows the appropriate gesture. In some cases, the user might eventually be able to logon simply by performing the gesture, without having to also say the specific words. This can be useful for systems such as home security systems, wherein a word and gesture combination can be used to activate or deactivate the alarm, call the police or perform some other such activity. Once a gesture is learned, either through repeated use or through a setup procedure, for example, the system can accept input using only a gesture. For example, if there is an intruder in someone's house, that person can call the police by making the gesture alone without also having to make a sound. If a user is choking, having a heart attack or is otherwise unable to speak (or at least speak clearly enough to provide accurate speech input), the user can perform the appropriate gesture in order to call for help, etc. In other embodiments, the gesture will at least help to interpret what the person is saying when they say "Call an ambulance" or provide another such command. Various other such situations should be apparent in light of the teachings and suggestions contained herein.

Figure 12:
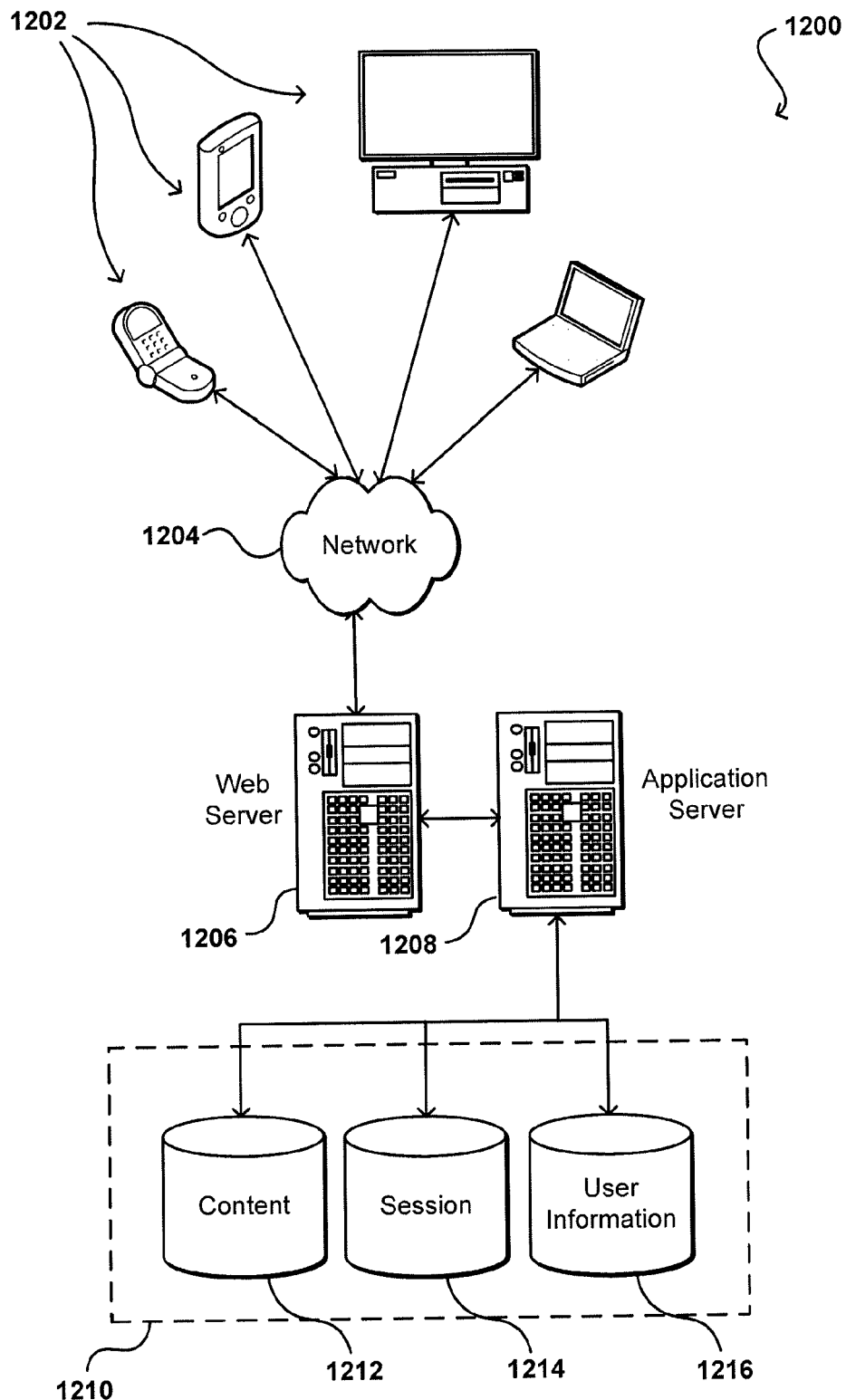
FIG. 12 illustrates an environment in which various embodiments can be implemented.

As discussed, different approaches can be implemented in various environments in accordance with the described embodiments. For example, FIG. 12 illustrates an example of an environment 1200 for implementing aspects in accordance with various embodiments. As will be appreciated, although a Web-based environment is used for purposes of explanation, different environments may be used, as appropriate, to implement various embodiments. The system includes an electronic client device 1202, which can include any appropriate device operable to send and receive requests, messages or information over an appropriate network 1204 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1206 for receiving requests and serving content in response thereto, although for other networks, an alternative device serving a similar purpose could be used, as would be apparent to one of ordinary skill in the art.

The illustrative environment includes at least one application server 1208 and a data store 1210. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1208 can include any appropriate hardware and software for integrating with the data store 1210 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1206 in the form of HTML, XML or another appropriate structured language in this example. The handling of all requests and responses, as well as the delivery of content between the client device 1202 and the application server 1208, can be handled by the Web server 1206. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing content (e.g., production data) 1212 and user information 1216, which can be used to serve content for the production side. The data store is also shown to include a mechanism for storing log or session data 1214. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1202. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of determining user input to a computing device, comprising:
    capturing audio data using at least one audio capture element of the computing device;
    concurrent with capturing audio data, capturing image data of the user using at least one image capture element of the computing device; and
    using at least one algorithm executing on a processor of the computing device:
        detecting a presence of speech information contained in the captured audio data;
        in the captured image data, detecting mouth movement of the user of the computing device at a time during which the speech information was detected;
        in response to detecting the presence of speech information and detecting mouth movement, identifying at least one user input based at least in part on a combination of the speech information and the mouth movement for a defined period of time, wherein the identifying of the at least one user input includes comparing the mouth movement in the captured image data to one or more word formation models, the one or more word formation models capable of being personalized for the user over a duration of time based at least in part on the speech information and the mouth movement of the user; and
        providing the user input for processing if a confidence level of the identified user input exceeds a minimum threshold, wherein the confidence level of the identified user input is relative to the combination of the speech information and the mouth movement, and wherein the confidence level of the identified user input is based at least in part on a metric indicating a level of matching between the identified user input and an input term.

2. The method of claim 1, wherein identifying the at least one user input utilizes at least one speech algorithm and at least one image analysis algorithm.

3. The method of claim 1, wherein the defined period of time utilizes audio data and image data captured for a substantially same period of time.

4. A method of determining input to a computing device, comprising:
    capturing audio data using at least one audio capture element of the computing device;
    capturing image data using at least one image capture element of the computing device;
    analyzing at least one of the audio data and the image data to determine whether a person interacting with the computing device is generating speech that is perceptible by the computing device; and
    if the speech is perceptible by the computing device,
        analyzing a combination of the audio data and the image data to determine at least a portion of the content of the speech, wherein the analyzed combination of audio data and image data are for a substantially same period of time, and wherein the analyzing includes, in part, comparing at least a portion of the image data to one or more word formation models that are capable of being personalized for the person over a duration of time based at least in part on the speech generated by the person; and
        if at least a portion of the content corresponds to an input to the computing device, processing the input, wherein the at least the portion corresponds to the input when the at least the portion matches the input at least at a defined confidence level, the defined confidence level being relative to the audio data and the image data.

5. The method of claim 4, wherein analyzing the image data comprises executing at least one algorithm for determining speech formation or gesturing of the person, the speech formation or gesturing used to determine input provided by the person.

6. The method of claim 4, further comprising:
    determining a state of the computing device; and
    determining a sub-dictionary to be used in identifying content of the speech, the sub-dictionary comprising terms at least partially relevant to the determined state and including fewer terms than a dictionary for general speech determination.

7. The method of claim 6, wherein the state of the device depends at least in part on an interface displayed on the device.

8. The method of claim 6, further comprising:
    determining an approximate location on the computing device at which the person is looking, the approximate location capable of being used to modify a currently selected sub-dictionary based at least in part upon one or more elements at that approximate location.

9. The method of claim 4, wherein a general speech model is able to be used to determine content of the speech data without the person first undertaking an initial training process.

10. The method of claim 4, wherein capturing image data only occurs when the captured audio data meets at least one triggering criterion.

11. The method of claim 10, wherein the at least one triggering criterion includes at least one of a minimum volume threshold or a frequency pattern matching human speech.

12. The method of claim 4, further comprising:
    irradiating the person with infrared (IR) radiation; and
    detecting IR reflected from at least one feature of the person in order to determine at least one aspect of the person with respect to the computing device.

13. The method of claim 12, wherein the reflected IR is analyzed to determine at least one of a gaze direction of the person and whether the user is forming speech.

14. The method of claim 4, wherein capturing image data comprises capturing image data corresponding to the person's mouth, and further comprising:
    monitoring movement of the person's mouth in order to determine speech being formed by the person's mouth.

15. The method of claim 4, wherein the person is a primary user of the computing device or another person within proximity of the computing device.

16. The method of claim 15, further comprising:
    determining the person speaking out of a plurality of people within a proximity of the computing device.

17. The method of claim 16, further comprising:
    accepting input only from an identified person authorized to provide input.

18. The method of claim 16, further comprising:
determining a context for the speech based at least in part upon an identity of the person providing the speech.

19. The method of claim 15, wherein the computing device includes at least two image capture elements positioned with respect to the computing device so as to be able to capture image data for a primary user of the device or other person within a proximity of the device.

20. The method of claim 15, wherein the audio capture element includes a plurality of microphones so as to be able to determine a location of the primary user, further comprising capturing audio data from a primary user from the determined location and rejecting noise sources from positions other than the location of the primary user.

21. The method of claim 4, further comprising:
associating a gesture made by the person concurrent with the determined speech generated, wherein after an initial period of association, the person is able to provide the input based only on the gesture and without the speech.

22. The method of claim 4, further comprising:
capturing an image of an object; and
determining the input for the speech based in part upon an identification of the object.

23. The method of claim 4, further comprising:
determining a location of the computing device or the person; and
determining the input for the speech based in part upon the determined location.

24. The method of claim 4, wherein the image capture element includes at least one of a digital camera element and an infrared (IR) radiation detector.

25. A computing device, comprising:
a processor;
a memory device including instructions operable to be executed by the processor to perform a set of actions, enabling the processor to:
capture audio data using at least one audio capture element in communication with the computing device;
capture image data using at least one image capture element in communication with the computing device;
analyze at least one of the audio data and the image data to determine whether a person interacting with the computing device is generating speech that is perceptible by the computing device; and
if the person is generating speech,
analyze a combination of the audio data and the image data to determine at least a portion of the content of the speech, wherein the analyzing includes, in part, comparing at least a portion of the image data to one or more word formation models that are capable of being personalized for the person over a duration of time based at least in part on the speech generated by the person; and
if the content corresponds to input to the computing device, process the input on the computing device, wherein the content corresponds to the input when the content matches the input at least at a defined confidence level, the defined confidence level being relative to the audio data and the image data.

26. The computing device of claim 25, wherein analyzing the image data comprises executing at least one algorithm for determining speech formation or gesturing of the user, the speech formation or gesturing capable of being used to determine input provided by the person.

27. The computing device of claim 25, wherein the instructions when executed further enable the computing device to:
determine a state of the computing device; and
determine a sub-dictionary to be used in identifying content of the speech, the sub-dictionary comprising terms at least partially relevant to the determined state and including fewer terms that a dictionary for general speech determination.

28. The computing device of claim 25, further comprising:
an infrared (IR) emitter for irradiating the person with IR radiation; and
an IR detector for detecting IR reflected from at least one feature of the person in order to determine at least one aspect of the person with respect to the computing device.

29. A non-transitory computer-readable storage medium storing processor-executable instructions for controlling a computing device, comprising:
program code for accessing audio data;
program code for accessing image data;
program code for analyzing at least one of the audio data and the image data to determine whether a person interacting with the computing device is generating speech that is perceptible by the computing device; and
program code for, if the person is generating speech,
analyzing a combination of the audio data and the image data to determine at least a portion of the content of the speech, wherein the analyzing includes, in part, comparing at least a portion of the image data to one or more word formation models that are capable of being personalized for the person over a duration of time based at least in part on the speech generated by the person; and
if the content corresponds to an input to the computing device, providing the input for processing, wherein the content corresponds to the input when the content matches the input at least at a defined confidence level, the defined confidence level being relative to the audio data and the image data.

30. The non-transitory computer-readable storage medium of claim 29, wherein analyzing the image data comprises executing at least one algorithm for determining speech formation or gesturing of the user, the speech formation or gesturing capable of being used to determine input provided by the person.

31. The non-transitory computer-readable storage medium of claim 29, further comprising:
program code for determining a state of the computing device; and
program code for determining a sub-dictionary to be used in identifying content of the speech, the sub-dictionary comprising terms at least partially relevant to the determined state and including fewer terms that a dictionary for general speech determination.

32. The non-transitory computer-readable storage medium of claim 31, further comprising:
program code for determining a region of interest on the computing device at which the person is looking; and
program code for modifying a currently selected sub-dictionary based in part upon one or more elements of the determined region of interest.

33. The non-transitory computer-readable storage medium of claim 29, wherein the computing devices includes at least two image capture elements, wherein analyzing a combination of the audio data and the image data to determine at least a portion of the content of the speech further comprising:

program code for identifying at least one image capture element generating an output that is greater than or equal to a threshold level; and program code for using the output from each identified image capture element to determine at least a portion of the content of the speech.

34. The non-transitory computer-readable storage medium of claim 29, wherein the computing devices each include at least two audio capture elements, wherein analyzing a combination of the audio data and the image data to determine at least a portion of the content of the speech further comprising:

program code for identifying at least one audio capture element generating an output that is greater than or equal to a threshold level; and program code for using the output from each identified audio capture element to determine at least a portion of the content of the speech.

* * * * *